United States Patent [19]

Obrero et al.

[11] Patent Number: 4,857,344
[45] Date of Patent: Aug. 15, 1989

[54] METHOD FOR TREATING PINEAPPLE TO INHIBIT BROWNING

[75] Inventors: Faustino P. Obrero; Wilfred H. Schnitzler, both of Manila, Philippines

[73] Assignee: Del Monte Corporation, San Francisco, Calif.

[21] Appl. No.: 948,130

[22] Filed: Dec. 31, 1986

[51] Int. Cl.$^4$ .............................. A23B 7/16
[52] U.S. Cl. .......................... 426/308; 426/102; 426/310; 426/333; 426/615
[58] Field of Search ............... 426/102, 310, 615, 308, 426/333; 134/25.3

[56] References Cited

U.S. PATENT DOCUMENTS

| | | | |
|---|---|---|---|
| 2,128,973 | 9/1938 | Tisdale | 426/308 |
| 2,332,151 | 10/1943 | Kalmai | 426/333 |
| 2,427,857 | 9/1947 | Hamill | 426/310 |
| 2,472,794 | 6/1949 | Cothran | 134/25.3 |
| 2,503,663 | 4/1950 | Gericke | 426/333 |
| 2,503,665 | 4/1950 | Gericke | 426/252 |
| 2,578,752 | 12/1951 | Slade | 426/333 |
| 2,582,868 | 1/1952 | Hausmann | 426/252 |
| 2,790,721 | 4/1957 | Toulmin . | |
| 2,819,972 | 1/1958 | Robbins . | |
| 2,819,973 | 1/1958 | Robbins . | |
| 2,849,320 | 8/1958 | Weinmann . | |
| 2,866,709 | 12/1958 | Gerwe et al. | 99/168 |
| 3,037,867 | 6/1962 | Dauden et al. | 426/310 |
| 3,346,397 | 10/1967 | Gortner | 426/615 |
| 3,566,814 | 3/1971 | Whitman . | |
| 3,847,641 | 11/1974 | Cushman et al. | 117/3 |
| 3,851,067 | 11/1974 | Bryan | 426/102 |
| 3,997,674 | 12/1976 | Ukai et al. | 426/102 |
| 4,006,259 | 2/1977 | Kalmar | 426/333 |
| 4,011,348 | 3/1977 | Farrier et al. . | |
| 4,049,837 | 9/1977 | Freebairn | 426/615 |
| 4,338,342 | 7/1982 | Tan et al. | 426/102 |
| 4,344,971 | 8/1982 | Garbutt | 426/102 |
| 4,434,185 | 2/1984 | Nelson | 426/310 |
| 4,614,659 | 9/1986 | Liu | 426/102 |
| 4,649,057 | 3/1987 | Thomson | 426/602 |

FOREIGN PATENT DOCUMENTS 938908  11/1961  United Kingdom ............... 426/335

OTHER PUBLICATIONS

Salunkhe, 1984, Postharvest Biotechnology of Fruits, vol. II, CRC Press, Boca Raton, FL, pp. 7-11.
Ewing et al., 1980, HortScience, vol. 15(3)425 Abstract.

*Primary Examiner*—Donald E. Czaja
*Assistant Examiner*—Carolyn Paden
*Attorney, Agent, or Firm*—Richard Kornutik

[57] ABSTRACT

Freshly harvested pineapple intended for sale in the fresh fruit market is treated with effective amounts of a nonionic or anionic surfactant-containing solution to inhibit internal browning. The fresh condition of the fruit is maintained for an increased period of time and the shelf life of the fruit is extended.

5 Claims, No Drawings

METHOD FOR TREATING PINEAPPLE TO INHIBIT BROWNING

FIELD OF THE INVENTION

This invention relates to a method for extending the shelf life of freshly harvested fruit by treating the fruit to inhibit internal browning. The invention also pertains to fruit treated according to the inventive method.

BACKGROUND OF THE INVENTION

In recent years, the fresh produce market has expanded as health-conscious consumers have demanded greater varieties and amounts of high quality fresh fruits and vegetables. Consequently, considerable efforts have been expended to ensure that losses due to spoilage or deterioration in quality of the produce are curtailed, so that consumers may enjoy the highest quality produce at the lowest possible price.

In particular, efforts have been directed at inhibiting the dark and unappealing color change known as "browning" which many fruits and vegetables suffer after being cut, scratched, or otherwise subjected to surface wounds during harvesting, packaging, or shipment. Browning, which is thought to result from the enzymatic oxidation of certain phenolic compounds present in the plant tissue, also occurs internally in uncut pineapple fruits. Internal browning is especially pronounced in fruit that has undergone cold storage during shipment. Because browning ruins the fresh quality of the harvested fruit over time, the marketable shelf life of the fruit is significantly decreased.

It is known in the art to treat fruit with heat (about 37° C.) before packaging or after shipment at the retail market to inactivate the enzymes, e.g., polyphenoloxidase, responsible for browning. Unfortunately, it has been found that such heat treatment enhances fruit senescence or post-harvest ripening, thereby shortening shelf life. Additionally, such methods are not reliable or practical for large commercial shipments.

Alternatively, wax coatings have been employed to suppress the internal browning of fruit. However, it is difficult to apply such wax coatings to all portions of the fruit without using so much wax that the "breathing" of the fruit is not interfered with to an undesirable extent. Moreover, some of the waxes commonly used to coat certain fruits, are only partially effective in suppressing the internal browning of other fruits. For example, two commercial waxes commonly used to coat apples, peaches, plums, tomatoes and the like, namely DECCO 201 and FMC 705 (commercially available from Decco Tilbelt and FMC Corp. respectively), which contain mainly paraffin and polyethylene waxes, in addition to minor amounts of emulsifiers as stabilizers, are only partially effective in retarding internal browning in pineapples.

SUMMARY AND OBJECTS OF THE INVENTION

Accordingly, it is an object of the present invention to provide a method for treating freshly harvested fruits and vegetables in order to inhibit undesirable discoloration or browning thereof during extended periods of storage.

A further object of the invention is to provide a method for preventing browning of fruits and vegetables using an aqueous solution of certain non-phytotoxic, and nonionic or anionic surfactants in the absence of added wax.

These objects and other subsidiary objects which will be apparent to those skilled in the art are achieved by the practice of the present invention.

The present invention provides a method for extending the shelf life of freshly harvested fruit subject to internal browning, which comprises applying effective amounts of an aqueous solution of a non-phytotoxic, and nonionic or anionic surfactant to the surface of the fruit to inhibit internal browning thereof. The freshly harvested condition of the treated fruit is preserved and the shelf life of the fruit is extended.

The surfactant is preferably a nonionic surfactant selected from the group consisting of ethoxylated natural fats and oils, ethoxylated alcohols, ethoxylated glycerol esters of fatty acids, ethoxylated alkylphenols and mixture thereof, or an anionic surfactant selected from the group consisting of alkylbenzenesulfonates, phosphate esters, sucrose esters, and mixture thereof.

DETAILED DESCRIPTION OF THE INVENTION

While the invention is susceptible to various modifications and alternative forms, there will be described herein in detail the preferred embodiments. It is to be understood, however, that it is not intended to limit the invention to the specific forms disclosed. On the contrary, it is intended to cover all modifications and alternative forms failing within the spirit and scope of the invention. For example, while the present invention will be particularly described in connection with the treatment of pineapples, it should be appreciated that the invention is equally applicable to other fruits and vegetables, such as apples, and peaches, which may be subject to internal browning.

Also, the term "fruit" as employed herein is to be understood broadly as including not only fruit proper, but also vegetables that can be treated to advantage in accordance with the principles of the invention to be hereinafter set forth.

The invention is based on the discovery that certain surfactants are effective for maintaining the fresh condition, and extending the shelf life of freshly harvested fruit. Accomplishment of this desirable goal is realized by coating the surface of the fruit with sufficient amounts of the surfactant to inhibit internal browning of the fruit. The surfactant is applied as an aqueous solution, by such methods as spraying, sponging, or dipping, so as to thoroughly coat the surface of the harvested fruit.

As understood by those skilled in the art, the term "surfactant" is used to describe a variety of amphipathic molecules composed of separated groups having opposing solubilizing tendencies. For example, a surfactant may contain an oil soluble hydrocarbon chain separated by a suitable degree from a water-soluble ionic group. C. Arno and J. Lynn, Jr., *Surfactants and Detersive Systems*, vol. 22 *Encyclopedia of Chemical Technology* 3rd ed. (Kirk-Othmer 1983), pp. 3323–336.

Surfactants are generally classified according to the charge of the larger group in the molecule. In anionic surfactants, this moiety carries a negative charge, while in cationic surfactants the charge is positive. Nonionic surfactants carry no charge, and the solubilizing contribution is usually supplied by a chain of ethylene oxide groups. In amphoteric surfactants, on the other hand, solubilization is provided by the presence of both positively and negatively charged groups.

There are a wide variety of surfactants, but tests have indicated that only certain ones of these, or mixtures thereof, are suitable for use in the present invention. The surfactant, which must be non-phytotoxic in the usual concentrations in which it is applied, is preferably a nonionic surfactant selected from the group consisting of ethoxylated glycerol esters of fatty acids, ethoxylated alkylphenols, ethoxylated natural fats and oils, ethoxylated alcohols, and mixtures thereof, or an anionic surfactant selected from the group consisting of phosphate esters, sucrose esters, alkylbenzenesulfonates, and mixtures thereof. Mixtures of such nonionic and anionic surfactants are also suitable.

While not wishing to be limited to a particular theory or mode of action, it is believed that the surfactant when applied provides a seal over substantially all of the fruit's surface, which limits the entry of oxygen needed for the enzymatic oxidation reactions that lead to internal browning. Additionally, it is believed that the applied surfactant also functions as a dispersant by causing any natural waxes present on the surface of the fruit to become evenly distributed over the fruit surface. Thus, the sealing effects provided by the natural waxes present on the fruit surface are enhanced.

Additionally, it has been found that the seal formed on the fruit's surface is effective for controlling certain fruit or vegetable diseases caused by microbial action. For example, it has been found that pineapples treated according to the invention are protected against infection by the microorganisms causing fruitlet-core rot and marbling.

The following surfactants have been found particularly effective at inhibiting internal browning and are most preferred:

1. LUTENSOL A-8 ™, an ethoxylation product of fatty alcohols derived from coconut oil which is commercially available from BASF, AG, West Germany;

2. TANDEM ®552, a blend of mono- and diglycerides, and polyoxyethylene sorbitan monostearates, which is commercially available from Kraft Inc., U.S.;

3. TRITON X-45 ™, an octyl phenoxy polyethoxy ethanol containing 5 mol of ethylene oxide, which is commercially available from Rohm & Haas, U.S.;

4. LOVING KL ™, a food detergent containing sucrose mono and dioleates, potassium pyrophosphate, and phosphoric acid, which is commercially available from KAO Food Co., Ltd., Japan.

The general freshness and natural green shell appearances of pineapples treated with aqueous solutions of LUTENSOL ™ A-8, TANDEM ®552, TRITON ™ X-45, and LOVING KL ™, were maintained in extended storage at about 50° F. for about 10 to about 25 days.

Other surfactants, such as TWEEN ™ (a polyoxyethylene sorbitan monolaurate manufactured by ICI, U.S. Inc.), PEGOSPERSE ™ (polyoxyethylene glycol esters of mono- and dioleates and mono- and diglycerides esters manufactured by Glyco Chemical, Inc.), HOESTICK ™ (a tributyl-nonyl-phenol polyglycol ether manufactured by Hoehst Chemical Co., Germany), BEALITE ™ (a blend of mono- and diglycerides and glycerol lacto esters of fatty acids manufactured by Beatrix Foods, Chicago U.S.A.), and various vegetables and mineral oils were also found to be useful but less effective than the preferred surfactants in inhibiting the internal browning of harvested pineapple fruits.

For the preservation of fruits in accordance with the invention, an aqueous solution having a surfactant concentration of from about 5 to about 15% by weight is preferably utilized. The preserving solution is applied to the fruit by spraying, sponging, or dipping the fruit into the solution soon after harvesting so as to ensure entire coating of the fruit surface. Although the amount of surfactant required per ton of fruit will vary depending on such factors as the size of the food item, the texture of its surface, and so forth, about 3 to 5 lbs. per ton of fruit are generally preferred.

The invention does not alter the conventional techniques employed in the harvesting, storage, shipment, and marketing of fruit treated according to the invention. Thus, the temperature and humidity conditions normally used for preserving the freshness of the harvested fruit are suitable for use in connection with this invention. Accordingly, the invention is particularly beneficial for preventing the pronounced browning which effects fruit subject to conventional cold storage during shipping.

By treating fruit with a surfactant in accordance with the invention, internal browning of the fruit is inhibited, the fresh condition of the fruit is preserved, and the shelf life is extended without adverse effects on the texture, appearance, or flavor of the treated fruit, and in the absence of added wax. Additionally, microbial spoilage of the harvested fruit is curtailed.

What is claimed is:

1. A method for extending the shelf life of freshly harvested pineapples subject to internal browning, which comprises the step of coating the surface of the pineapple with an amount of a wax-free aqueous solution of a non-phytotxic, and nonionic or anionic surfactant which is effective to limit entry of oxygen into the pineapple to inhibit internal browning thereof, wherein the aqueous solution comprises from about 5 to about 15% surfactant by weight and is free of sodium hypochlorite wherein said nonionic surfactant is selected from the group consisting of ethoxylated natural fats and oils, ethoxylated alkylphenols, ethoxylated alcohols, ethoxylated glycerol esters of fatty acids and mixtures thereof and said anionic surfactant is selected from the group consisting of alkylbenzene sulfonates, phosphate esters, sucrose esters and mixtures thereof.

2. The method according to claim 1, wherein the pineapple is coated with the surfactant by a method selected from the group consisting of spraying, sponging, or dipping.

3. The method according to claim 1, wherein about 3 to 5 lbs. of surfactant are applied per ton of fruit.

4. The method according to claim 1, wherein the amount of aqueous solution applied is also effective to control fruit or vegetable diseases caused by microbial action.

5. The method according to claim 4, wherein the disease is a pineapple fruit disease selected from the group consisting of fruitlet-core rot and marbling.

* * * * *